(12) United States Patent
Schumacher et al.

(10) Patent No.: US 8,464,506 B2
(45) Date of Patent: Jun. 18, 2013

(54) MOWING FINGER ARRANGEMENT

(75) Inventors: Gustav Schumacher, Eichelhardt (DE); Friedrich-Wilhelm Schumacher, Eichelhardt (DE)

(73) Assignee: Erfindergemeinschaft Gustav und Fred Schumacher GbR, Eichelhardt (DE)

( * ) Notice: Subject to any disclaimer, the term of this patent is extended or adjusted under 35 U.S.C. 154(b) by 0 days.

(21) Appl. No.: 12/754,911

(22) Filed: Apr. 6, 2010

(65) Prior Publication Data

US 2010/0251684 A1   Oct. 7, 2010

(30) Foreign Application Priority Data

Apr. 6, 2009   (EP) .................................... 09005046

(51) Int. Cl.
*A01D 34/18*   (2006.01)

(52) U.S. Cl.
USPC .......................................................... 56/298

(58) Field of Classification Search
USPC .................. 56/298, 307–313, DIG. 20
See application file for complete search history.

(56) References Cited

U.S. PATENT DOCUMENTS

| 3,699,758 | A | * | 10/1972 | Scarnato et al. | ............... | 56/307 |
| 4,286,425 | A | | 9/1981 | Schumacher, II et al. | | |
| 4,750,321 | A | * | 6/1988 | Klein | ............... | 56/310 |
| 4,909,026 | A | * | 3/1990 | Molzahn et al. | ............... | 56/298 |
| 5,077,962 | A | * | 1/1992 | Schumacher et al. | ........... | 56/310 |
| 5,241,811 | A | * | 9/1993 | Bolinger | ........................ | 56/310 |
| 6,250,057 | B1 | * | 6/2001 | Schumacher et al. | ........... | 56/298 |
| 6,442,919 | B1 | * | 9/2002 | Schumacher et al. | ........... | 56/307 |
| 2002/0005035 | A1 | | 1/2002 | Hovsepian | | |

FOREIGN PATENT DOCUMENTS

| DE | 29 45 960 | 5/1981 |
| DE | 28 55 234 | 2/1986 |
| DE | 197 34 337 | 6/1998 |
| GB | 2 126 065 | 3/1984 |

* cited by examiner

*Primary Examiner* — Thomas B Will
*Assistant Examiner* — Mai Nguyen
(74) *Attorney, Agent, or Firm* — Harness, Dickey & Pierce, P.L.C.

(57) ABSTRACT

A mowing finger arrangement has a lower element (4) and an upper element (3). The lower (4) and upper (3) elements are connected to each other and form two mowing fingers (1, 2) and a blade gap (15). The blade gap (15) guides a mowing sickle between the lower element (4) and the upper element (3). The lower element (4) forms lower counter cutting edges (20, 21). The upper element (3) forms upper counter cutting edges (22, 23) for the mowing sickle. The two mowing fingers (1, 2) are connected to each other via a rear (26) and a front (29) connection web on the upper element (3) and via a rear (35) and a front (34) connection web on the lower element (4). The two front connection webs (29, 34) of the lower element (4) and the upper element (3) define part of the blade gap (15).

15 Claims, 5 Drawing Sheets

US 8,464,506 B2

MOWING FINGER ARRANGEMENT

CROSS-REFERENCE TO RELATED APPLICATION

This application claims priority to European Patent Application No. 090054046.9 filed Apr. 6, 2009, which application is herein expressly incorporated by reference.

FIELD

The disclosure relates to a mowing finger arrangement for finger bar mowers of harvesting machines. The mowing finger arrangement serves to guide a mower sickle and forms counter cutting edges for the cutting blades arranged on the mowing sickle.

BACKGROUND

DE 28 55 234 C2 illustrates a double mowing finger that can be attached onto a bed plate. The double finger includes an upper element and a lower element. A blade gap is formed between the upper and lower elements to accommodate the mowing sickle. The lower element includes a support plate and a carrier. The support plate forms a sickle support for each mowing finger. The sickle supports are connected to each other at a rear end via a connection web. The carrier has a carrier arm for each mowing finger. The carrier arms are connected via a further connection web to each other. The upper element is formed in two parts with two separate fingers. The two fingers are connected at a free end with the fingers of the lower element to form the sickle support. The two fingers can, respectively, be attached on an end facing to the rear on the bed plate. It is disadvantageous in this case, however, that the two separate fingers of the upper element are only stabilised by the assembly on the bed plate. Especially as transverse forces are applied to the fingers, as they can, for example, be produced when a stone gets between a sickle blade and a counter cutting edge, the double finger can be easily bent.

DE 197 34 337 A1 illustrates a similar double finger design. Here, the fingers of the upper element are connected to each other at their rear ends via a connection web. However, in this case the danger still exists, that when transverse forces are produced, the fingers of the upper element, especially, in the area of the blade gap, can be easily bent.

DE 29 45 960 A1 discloses a similar double finger design. Here in one embodiment, the connection web, between the fingers of the upper element, is not arranged at the rear end of the finger, but further to the front. Thus, when transverse forces are produced, a bending of the rear end of the finger of the upper element can be produced. Further, the entire connection web is formed with a bulge to enable the attachment screws, with which the cutting blades are attached on a sickle bar, to pass between the upper element and the lower element of the double finger. In this case, the bulge cannot be produced high enough to mount the mowing sickle in two different assembly positions. The mowing sickle can only be used such that screw heads project upwards from the attachment screws of the cutting blades. In a reversed assembly position where the screw nuts project upwards, the cutting blade cannot be mounted. Here, the screw shafts pass through the screw nuts and project further from the mowing sickle than the screw heads. The height of the bulge is limited insofar as in the transition from the connection web to the attachment ends of the finger of the upper element, warpages are produced during excessive degrees of deformation.

SUMMARY

It is an object of the present disclosure to provide a mowing finger arrangement that has a high stability against transverse forces.

The object is solved according to the disclosure by a mowing finger arrangement that has a lower element and an upper element. The lower and upper elements are connected to each other and form two mowing fingers. A blade gap is formed between the lower and upper elements. The gap guides a mowing sickle between the lower element and the upper element. The lower element forms lower counter cutting edges for the mowing sickle. The upper element forms upper counter cutting edges for the mowing sickle. The two mowing fingers are connected to each other via a front and rear connection web on the upper element and via a front and rear connection web on the lower element. The two front connection webs of the lower element and of the upper element define part of the blade gap.

Because of the two connection webs on the upper element, a higher stability of the upper element is created. Thus, higher stability of the entire mowing finger arrangement is achieved. Furthermore, even with a higher stability, the connection webs can be formed thinner than would be possible with only one connection web. Thus, it is possible, that, between the two connection webs on the upper element, the mowing fingers have a bulge that has a higher degree of deformation than that of the State of the Art. Thus, the bulge can be formed higher that also enables mounting of a mowing sickle with upwards facing screw nuts.

Preferably, when viewed in a working direction, the rear connection web of the upper element is arranged at a rear end of the mowing finger. In this case, the upper element rear connection web serves as the attachment of the mowing finger arrangement onto a bed plate. The lower element rear connection web can also be arranged, when viewed in working direction, on the rear end of the mowing finger. It serves, preferably, as the attachment of the mowing finger arrangement onto the bed plate. Thus, the bed plate is arranged between the rear connection web of the upper element and the rear connection web of the lower element during the assembly of the mowing finger arrangement.

In a preferred embodiment, the lower element has a first sickle support on a first of the two mowing fingers and a second sickle support on a second of the two mowing fingers. The two sickle supports are connected to each other via the front connection web of the lower element. The front connection web of the lower element forms a third sickle support.

Furthermore, the upper element has a first sickle abutment on a first of the two mowing fingers and a second sickle abutment on a second of the two mowing fingers. The two sickle abutments are connected to each other via the front connection web of the upper element. The front connection web of the upper element forms a third sickle abutment.

Thus, the upper element front connection web also serves to guide the sickle or the cutting blades, respectively. Thus, the upper element front connection web is more or less flat and is arranged parallel to the sickle abutments of the lower element.

In this case, the sickle supports of the lower element and the sickle supports of the upper element form the blade gap.

The first and the second sickle support form, respectively, two lower counter cutting edges. The first and the second sickle abutments form, respectively, two upper counter cutting edges for the cutting blades of the mowing sickle.

The upper element has a bulge for each mowing finger between the front and the rear connection web.

Preferably, the upper element is formed flat in the area of the first and the second sickle abutment. The bulge starts, when viewed in a working direction, in front of a rear edge of the front connection web of the upper element. Thus, the bulge can begin as soon as possible, when viewed in working direction, and can extend as far as possible away from the lower element. This forms the largest possible space for the mowing sickle and the attachment screws of the cutting blades. As, in this case, the front connection web of the upper element is not bulged. Thus, no warpages can be produced, so that the bulge can be formed higher than this is common in the State of the Art.

In a preferred embodiment the lower element has a support plate that forms the sickle supports. Furthermore, the lower element has a carrier that is connected to the support plate. The carrier includes the rear connection web of the lower element.

To ensure an increased stability against bending in the transverse direction, the lower element rear connection web is provided with attachment through openings. The openings are provided to attach the mowing finger arrangement onto a bed plate. The openings have a cross-section deviating from a circle.

Further areas of applicability will become apparent from the description provided herein. The description and specific examples in this summary are intended for purposes of illustration only and are not intended to limit the scope of the present disclosure.

DRAWINGS

In the following, a preferred embodiment is described in detail using the drawings.

FIG. 3 is a longitudinal sectional view of the mowing finger arrangement according to FIG. 2 along line III-III there of.

DETAILED DESCRIPTION

Figure 1:
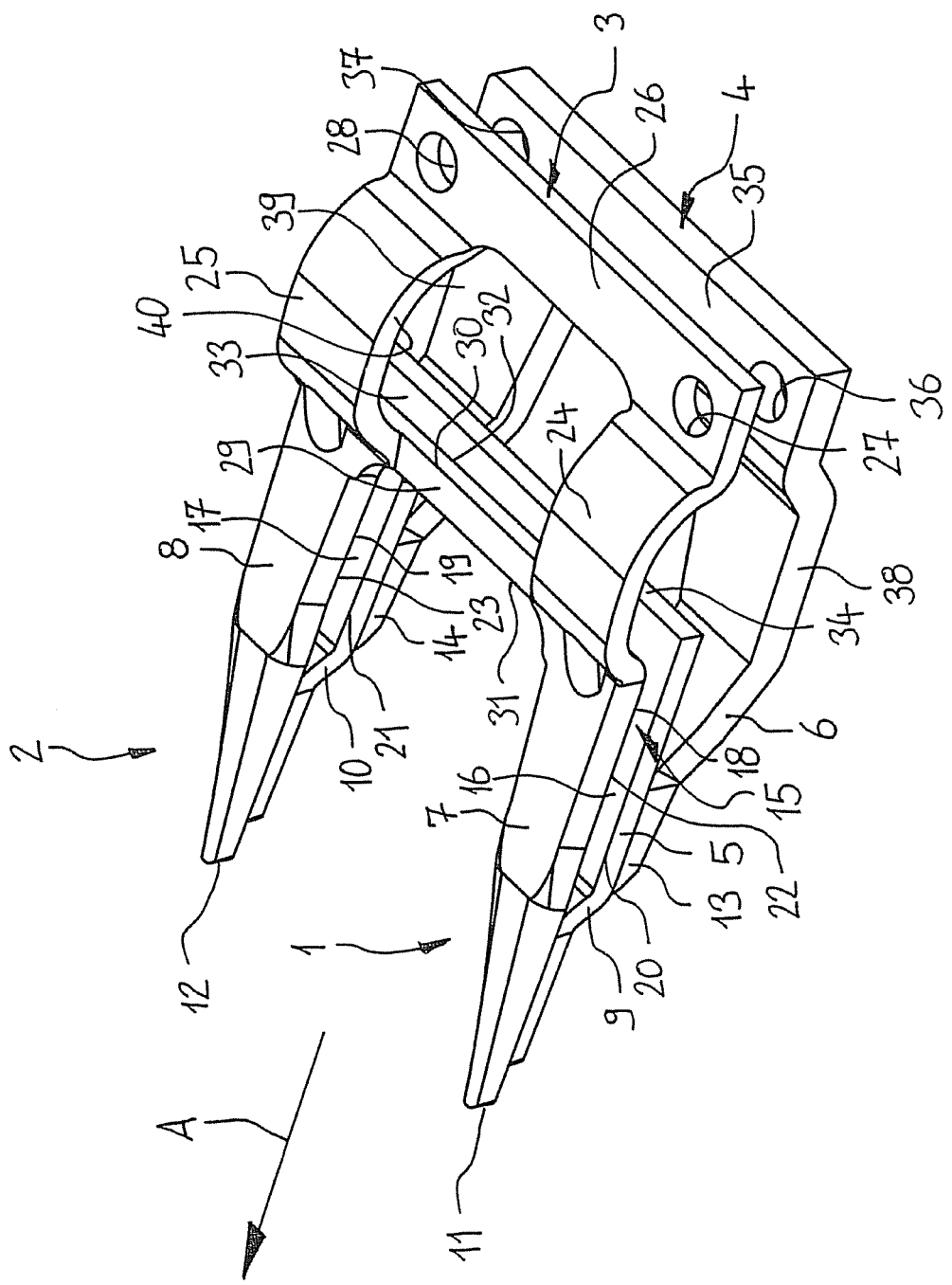
FIG. 1 is a perspective view of a mowing finger arrangement according to the disclosure.
Figure 2:
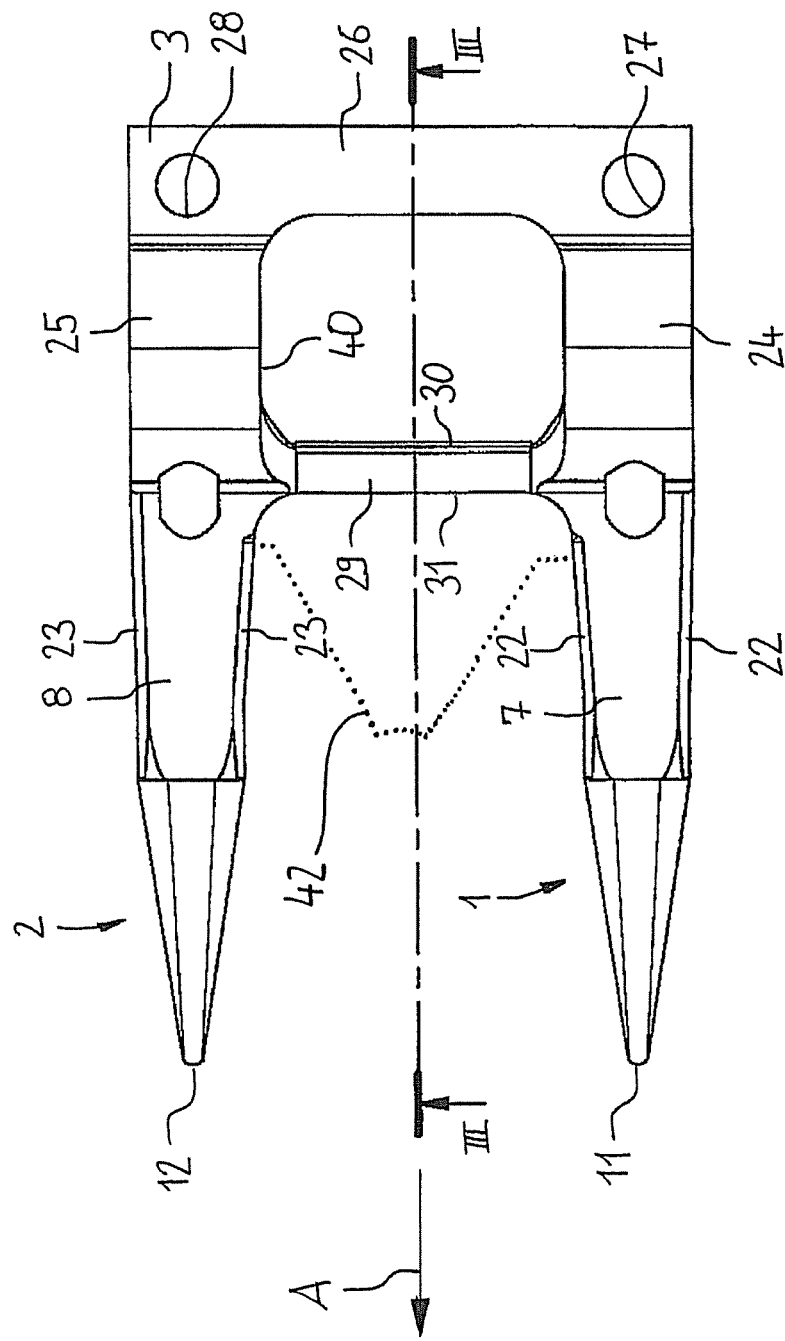
FIG. 2 is a top view of the mowing finger arrangement according to FIG. 1.
Figure 3:
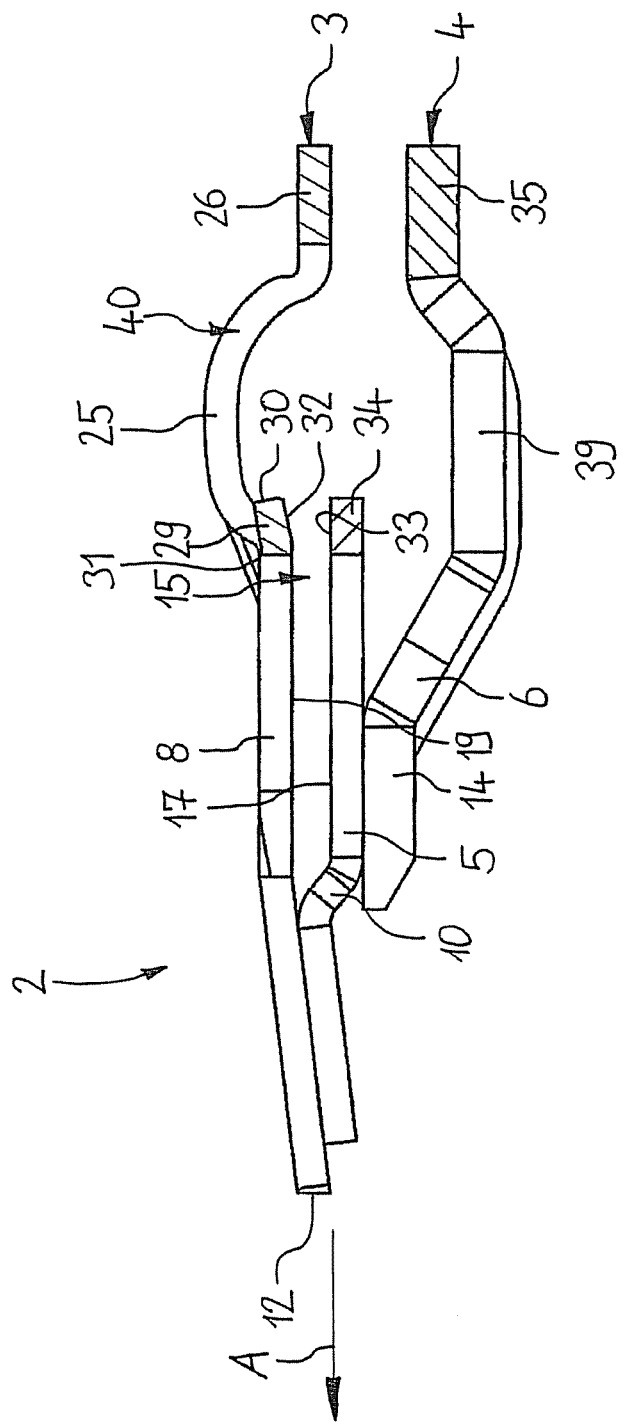

A preferred embodiment of the present disclosure will be described with reference to the accompanying drawings.

FIGS. 1 to 5 illustrate the mowing finger arrangement according to the disclosure in different views. They are described in the following together. The mowing finger arrangement has a first mowing finger 1 and a second mowing finger 2. The mowing fingers 1, 2 are aligned to the front in a working direction A. The working direction A means the movement direction of the entire mower during the cutting process.

The mowing finger arrangement includes an upper element 3 and a lower element 4. In this case, the lower element 4 is formed by a support plate 5 and a carrier 6. The support plate 5 and carrier 6 are rigidly connected to each other. Preferably, the support plate 5 and the carrier 6 are welded to each other.

The upper element 3 is formed from a sheet-metal forming. The upper element 3 has a first upper finger portion 7 and a second upper finger portion 8. The support plate 5 is a punched part made from sheet-metal. The support plate 5 has a first lower finger portion 9 and a second lower finger portion 10. The first upper finger portion 7 and the first lower finger portion 9 are welded to each other at a free end 11 of the first mowing finger 1. The second upper finger portion 8 and the second lower finger portion 10 are welded to each other at a free end 12 of the second mowing finger 2.

The carrier 6 has a first carrier arm 13. The first carrier arm 13 is rigidly connected to the first lower finger portion 9 by welding. The carrier 6 has a second carrier arm 14 that is welded to the second lower finger portion 10. In this case, the carrier 6 is also made by a sheet-metal forming process as is the upper element 3.

In a side view, when seen transversally to the working direction A, a blade gap 15 is formed between the upper element 3 and the support plate 5. Cutting blades of a sickle 42 are movably guided in the blade gap 15 in an oscillating manner transversally to the working direction A. In this case, the cutting blades have a triangularly form when seen in a top view. A tip of the triangle is directed to the front in working direction A, as this is generally known from the State of the Art.

The support plate 5 has a first sickle support 16 on the first mowing finger 1. The first sickle support 16 is formed as a flat surface against which the cutting blades abut. The first sickle support 16 is directed upwards. A first sickle abutment 18 is formed on the first upper finger portion 7 of the upper element 3. The first sickle abutment 18 is positioned opposite to the first sickle support 16. Thus, the cutting blades can be supported downwards on the first sickle support 16 as well as upwards on the first sickle abutment 18. Furthermore, the first sickle support 16 forms first lower counter cutting edges 20. The first sickle abutment 18 forms first upper counter cutting edges 22. The counter cutting edges 20, 22 co-operate with the cutting edges of the cutting blades, to cut the harvested goods.

The second mowing finger 2 is formed analogueously to the first mowing finger 1. The second lower finger portion 10 includes a second sickle support 17 that is arranged opposite to a second sickle abutment 19 of the second upper finger portion 8. In this case, the second sickle support 17 forms second lower counter cutting edges 21. The second sickle abutment 19 forms second upper counter cutting edges 23.

All sickle supports 16, 17 and sickle abutments 18, 19 are flat and arranged at least nearly parallel to each other. A gap is formed between the first sickle support 16 and the first sickle abutment 18, as well as between the second sickle support 17 and the second sickle abutment 19. The two gaps are part of the blade gap 15.

The first upper finger portion 7 has, facing to the rear, a first upper bulge 24. The second upper finger portion 8 has a corresponding second upper bulge 25. The two upper bulges 24, 25 are arched upwards in this case at the rear, facing away from the free ends 11, 12. An upper element rear connection web 26 is provided. The connection web 26 connects the first upper finger portion 7 to the second upper finger portion 8. Attachment bores 27, 28 are provided in the upper element rear connection portion 26. The attachment bores 27, 28 enable the mowing finger arrangement to be attached onto a bed plate 41 of a mower.

An upper element front connection web 29 is provided between the two upper finger portions 7, 8. The upper element front connection web 29 has a rear edge 30. The rear edge 30 faces the upper element rear connection web 26. The upper bulges 24, 25 starts, when viewed in working direction A, in front of the rear edge 30. In the present case, the bulges 24, 25 extend from a front edge 31 of the upper element front connection web 29.

An opening is formed between the upper element connection webs 26, 29 and the upper bulges 24, 25. The opening 40 extends into the rear connection web 26 of the upper element 3. Thus, this ensures that the upper element rear connection web 26 is not bulged, which can lead to warpage during the forming.

The upper element front connection web 29 is arranged approximately parallel to a front connection web 34 of the lower element 4. The upper element front connection web 29 is thus, not bulged. The upper element front connection web 29 forms a third sickle abutment 32. The third sickle abutment 32 is directed downwards and is arranged approximately parallel to a third sickle support 33. The third sickle support 33 is formed by the lower element front connection web 34. Thus, a further gap is formed between the third sickle abutment 32 and the third sickle support 33. The further gap is also part of the blade gap 15.

The carrier 6 has a first and a second lower bulge 38, 39, respectively, directed from the first and the second sickle support 16, 17 to the rear. The first and second lower bulge 38, 39 are arched downwards. The upper bulges 24, 25 are, respectively, arranged above one of the lower bulges 38, 39. The upper 24, 25 and lower 38, 39 bulges serve to accommodate the sickle 42 with the attachment screws of the cutting blades 43.

Figure 4:
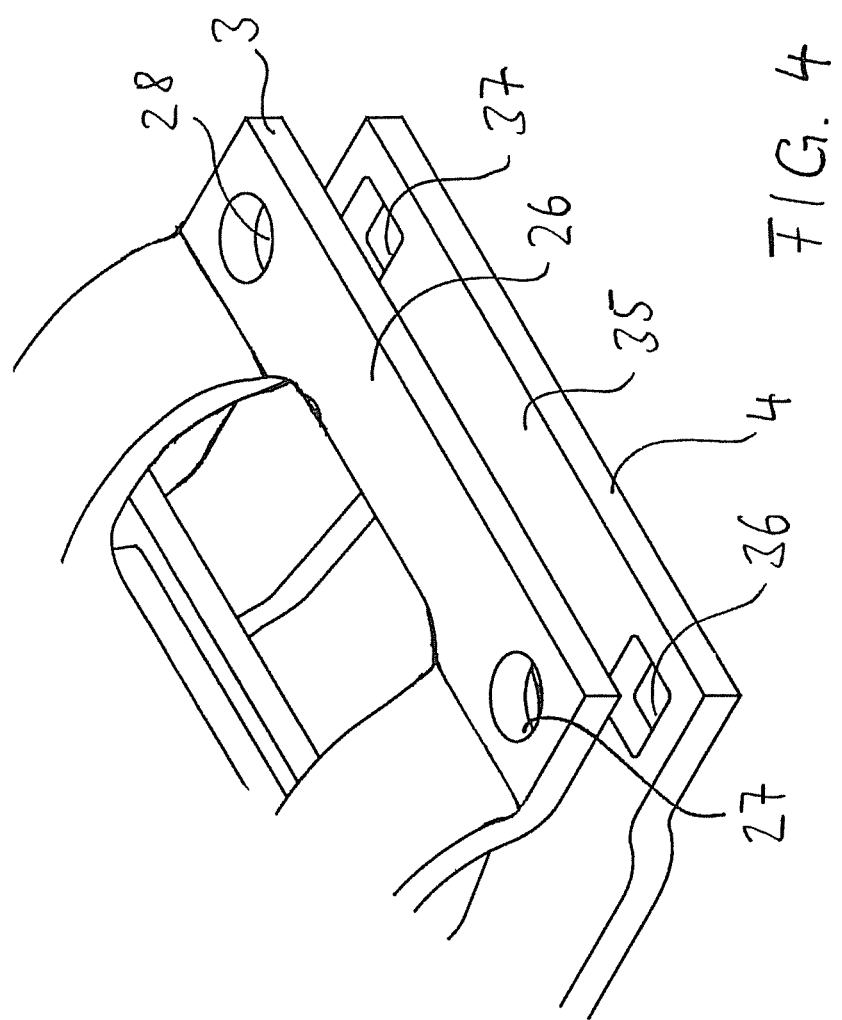
FIG. 4 illustrates alternative attachment bores in a lower element of the mowing finger arrangement according to FIG. 1 in detail.
Figure 5:
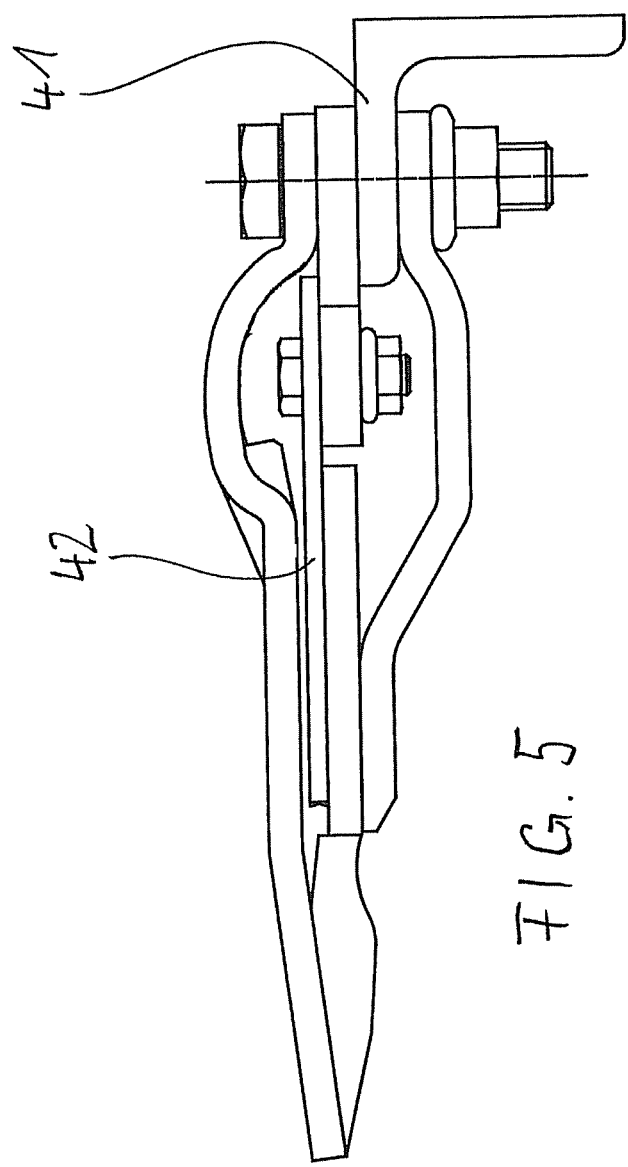
FIG. 5 is a side view of the mowing finger arrangement according to FIG. 1 attached to a bed plate and together with a mowing sickle.

The carrier 6 has a lower element rear connection web 35 at the rear end, facing away from the free ends 11, 12 of the mowing finger 1, 2. The lower element rear connection web 35 includes attachment bores 36, 37. The attachment bores 36, 37 are aligned with the attachment bores 27, 28 of the upper element 3. Thus, all the attachment bores 27, 28, 36, 37 enable the mowing finger arrangement to be mounted on a bed plate by attachment screws. Preferably, the lower element attachment bores 36, 37 are formed in cross-section such that they deviate from a circle as illustrated in FIG. 4. Thus, via correspondingly formed attachment means on the cutting finger bar, the carrier 6 can be secured against torsion.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A mowing finger arrangement comprising:
   a lower element and an upper element are connected to each other and form two mowing fingers;
   a blade gap for guiding a mowing sickle is formed between the lower element and the upper element, the lower element forms lower counter cutting edges and the upper element forms upper counter cutting edges for the mowing sickle;
   a rear and a front connection web on the upper element and a rear and a front connection web on the lower element connect the two mowing fingers to each other;
   the two front connection webs of the lower element and the upper element face one another to define part of the blade gap, the front connection web of the upper element is substantially flat and planar and is arranged substantially parallel to the front connection web of the lower element;
   wherein the upper element is made of sheet metal and has an upper bulge between the front and the rear connection webs for each mowing finger; and
   wherein the front connection web is not bulged.

2. The mowing finger arrangement according to claim 1, wherein the upper element rear connection web is arranged at a rear end of the mowing finger when viewed in a working direction.

3. The mowing finger arrangement according to claim 1, wherein the upper element rear connection web enables attachment of the mowing finger arrangement onto a bed plate.

4. The mowing finger arrangement according to claim 1, wherein the lower element rear connection web is arranged at a rear end of the mowing finger when viewed in a working direction.

5. The mowing finger arrangement according to claim 1, wherein the lower element rear connection web enables attachment of the mowing finger arrangement on a bed plate.

6. The mowing finger arrangement according to claim 1, wherein the lower element has a first sickle support on a first of the two mowing fingers and a second sickle support on a second of the two mowing fingers, and the two sickle supports are connected to each other via the lower element front connection web and the lower element front connection web forms a third sickle support.

7. The mowing finger arrangement according to claim 6, wherein the first and the second sickle support form, respectively, two of said lower counter cutting edges.

8. The mowing finger arrangement according to claim 6, wherein the upper element has a first sickle abutment on a first of the two mowing fingers and a second sickle abutment on a second of the two mowing fingers, and the two sickle abutments are connected to each other via the upper element front connection web and the upper element front connection web forms a third sickle abutment.

9. The mowing finger arrangement according to claim 8, wherein the first and the second sickle abutment form, respectively, two of said upper counter cutting edges.

10. The mowing finger arrangement according to claim 8, wherein the lower element sickle supports and the upper element sickle abutments form the blade gap.

11. The mowing finger arrangement according to claim 1, wherein the upper element is flat in the area of the first and the second sickle abutments and the upper bulges start, when viewed in a working direction, in front of a rear edge of the front connection web of the upper element.

12. The mowing finger arrangement according to claim 1, wherein the upper element connection web and the upper bulges form an opening which partially extends into the rear connection web.

13. The mowing finger arrangement according to claim 1, wherein the lower element has a support plate that forms a sickle supports and the lower element has a carrier that is connected to the support plate and includes the lower element rear connection web.

14. The mowing finger arrangement according to claim 1, wherein the lower element rear connection web includes attachment through openings for attaching the mowing finger arrangement to a bed plate, said openings have a cross-section deviating from a circle.

15. A mowing finger arrangement comprising:
   a lower element and an upper element are connected to each other and form two mowing fingers;
   a blade gap for guiding a mowing sickle is formed between the lower element and the upper element, the lower element forms lower counter cutting edges and the upper element forms upper counter cutting edges for the mowing sickle;

a rear and a front connection web on the upper element and a rear and a front connection web on the lower element connect the two mowing fingers to each other;

the two front connection webs of the lower element and the upper element define part of the blade gap;

wherein the upper element is made of sheet metal and has an upper bulge between the front and the rear connection webs for each mowing finger; and the front connection web is substantially flat and planar and has a rear edge with the upper bulge extending from the front connection web in front of the rear edge.

* * * * *